US012699039B2

(12) United States Patent　　　　(10) Patent No.: US 12,699,039 B2

Senderos et al.　　　　　　　　　　(45) Date of Patent: Aug. 4, 2026

(54) FLEXURAL CORROSION MACHINE ADVANCE MODEL

(71) Applicant: THE BOEING COMPANY, Arlington, VA (US)

(72) Inventors: Bruno Zamorano Senderos, Huntsville, AL (US); Ethan L. Moore, Madison, AL (US); Kristen S. Williams, Madison, AL (US)

(73) Assignee: The Boeing Company, Arlington, VA (US)

( * ) Notice: Subject to any disclaimer, the term of this patent is extended or adjusted under 35 U.S.C. 154(b) by 293 days.

(21) Appl. No.: 18/417,087

(22) Filed: Jan. 19, 2024

(65) Prior Publication Data

US 2025/0237597 A1　　Jul. 24, 2025

(51) Int. Cl.
G01N 17/02　　　　(2006.01)
G01M 5/00　　　　(2006.01)
　　　　(Continued)

(52) U.S. Cl.
CPC ........ G01N 17/002 (2013.01); G01M 5/0075 (2013.01); G01N 3/18 (2013.01);
　　　　(Continued)

(58) Field of Classification Search
CPC ..... G01N 2203/0023; G01N 2203/024; G01N 3/04; G01N 3/20; G01N 2203/0005; G01N 2203/0282; G01N 17/002; G01N 3/02; G01N 3/08; G01N 3/32; G01N 17/00; G01N 2203/0016; G01N 2203/0252; G01N 2203/0266; G01N 15/0806; G01N 17/006; G01N 2203/0003; G01N 2203/001; G01N 2203/0062; G01N 2203/0073; G01N 2203/0298; G01N 2203/0464; G01N 3/24; G01N 3/34; G01N 33/00; G01N 33/0003; G01N 15/08; G01N 17/02; G01N 17/04; G01N 2203/0026; G01N 2203/003;

(Continued)

(56) References Cited

U.S. PATENT DOCUMENTS 8,365,611 B1　2/2013　Darveaux et al.
10,012,581 B2　7/2018　Pennell et al.
　　　　(Continued)

FOREIGN PATENT DOCUMENTS

CN　　200972450 Y　*　11/2007
CN　　203216823 U　*　9/2013
　　　　(Continued)

OTHER PUBLICATIONS

Eurpoean Patent Office, Extended European Search Report, App. No. 24216619.7 (Jun. 6, 2025).

*Primary Examiner* — Andre J Allen

(74) *Attorney, Agent, or Firm* — Walters & Wasylyna LLC

(57)　　　　ABSTRACT

In one aspect, a material testing apparatus includes an enclosure configured to control one or more of humidity, pressure, or temperature. The enclosure includes a jaw, a plate, a first planar wall disposed on top of the plate, and a second planar wall parallel to the first planar wall separated by a vertical wall. A motor or actuator is disposed exterior to the enclosure, in which the motor includes a drive shaft coupled to a plurality of guide rods that are in contact with the vertical wall.

20 Claims, 7 Drawing Sheets

(51) Int. Cl.
*G01N 3/18* (2006.01)
*G01N 3/20* (2006.01)
*G01N 17/00* (2006.01)

(52) U.S. Cl.
CPC .............. *G01N 3/20* (2013.01); *G01N 17/02* (2013.01); *G01N 2203/024* (2013.01); *G01N 2203/0242* (2013.01); *G01N 2203/0476* (2013.01)

(58) Field of Classification Search
CPC ... G01N 2203/0051; G01N 2203/0202; G01N 2203/0226; G01N 2203/0232; G01N 2203/0234; G01N 2203/0242; G01N 2203/0246; G01N 2203/0254; G01N 2203/0274; G01N 2203/0435; G01N 2203/0641; G01N 27/226; G01N 27/49; G01N 27/902; G01N 3/12; G01N 3/18; G01N 3/38; G01N 33/383; G01N 1/38; G01N 11/00; G01N 11/02; G01N 19/00; G01N 19/10; G01N 2001/2261; G01N 2021/0106; G01N 21/01; G01N 21/29; G01N 21/35; G01N 21/3504; G01N 21/3554; G01N 21/3581; G01N 21/84; G01N 21/88; G01N 2201/022; G01N 2203/0017; G01N 2203/0033; G01N 2203/0037; G01N 2203/0044; G01N 2203/0075; G01N 2203/022; G01N 2203/0222; G01N 2203/0224; G01N 2203/023; G01N 2203/0236; G01N 2203/0676; G01N 25/00; G01N 25/56; G01N 27/00; G01N 27/20; G01N 27/223; G01N 3/14; G01N 3/36; G01N 33/0006; G01N 33/0009; G01N 33/0016; G01N 33/0036; G01N 33/227; G01N 33/28; G01N 33/346; G01N 37/00; G01N 9/00; G01N 9/32; G01M 15/14; G01M 3/002; G01M 3/02; G01M 5/0016; G01M 5/005; G01M 3/20; G01M 3/3263; G01M 3/3272; G01M 3/3281; G01M 3/329
See application file for complete search history.

(56) References Cited

U.S. PATENT DOCUMENTS

| | | | |
|---|---|---|---|
| 10,393,645 B2 | 8/2019 | Williams et al. | |
| 10,768,093 B2 * | 9/2020 | Friedersdorf | .......... G01N 27/20 |
| 11,175,214 B2 | 11/2021 | Williams et al. | |
| 2018/0099755 A1 * | 4/2018 | Borumand | ............... B64F 5/60 |
| 2018/0313745 A1 | 11/2018 | Pennell et al. | |

FOREIGN PATENT DOCUMENTS

| | | | |
|---|---|---|---|
| CN | 212539954 U | | 2/2021 |
| CN | 217033332 U | | 7/2022 |
| JP | 2012242342 A | * | 12/2012 |

* cited by examiner

FLEXURAL CORROSION MACHINE ADVANCE MODEL

FIELD

Aspects of the present disclosure generally relate to apparatuses and methods for determining operational performance of material systems.

BACKGROUND

Spanning the lifetime of operation, an aircraft will experience repeated and harsh conditions that may result in degradation of some of the component parts of the aircraft. Such degradation may take the form of, for example, coating failure and/or corrosion. Corrosion can contribute to a decrease in the integrity and strength of aircraft components. More specifically, a material system, such as an aircraft component, includes a fuselage or skin panels, a coated lap joint between two metal panels, or a wing-to-fuselage assembly on the exterior of an aircraft. Material systems may corrode over time due to exposure to mechanical and chemical stresses during use of the aircraft.

Before a material is determined to be suitable for use as an aircraft material system, it may be desirable to determine the material system's propensity to corrode. However, performance of aircraft material systems, such as panels, during actual, real world use of the aircraft may not correlate with coating and/or corrosion testing data.

Therefore, there is a need in the art for improved apparatuses and methods for determining operational performance of material systems.

SUMMARY

In one aspect, the present disclosure provides an apparatus including an enclosure configured to control one or more of humidity, pressure, or temperature. The enclosure includes a jaw, a plate, a first planar wall disposed on top of the plate, and a second planar wall parallel to the first planar wall separated by a vertical wall. A motor or actuator is disposed exterior to the enclosure, in which the motor includes a drive shaft coupled to a plurality of guide rods that are in contact with the vertical wall.

In another aspect, the present disclosure provides an apparatus including an enclosure configured to control one or more of humidity, pressure, or temperature. The enclosure includes a jaw having one or more securing screws oriented symmetrically along the jaw. The apparatus includes a plate. A motor or actuator is disposed exterior to the enclosure, in which the motor includes a drive shaft coupled to a plurality of guide rods that are in contact with the vertical wall.

In another aspect, the present disclosure provides a method for determining material performance. The method includes exposing a material system to a relative humidity of from 0% to 100% in an apparatus and flexing the material system using a jaw in the apparatus at a first temperature in an enclosure of the apparatus. A motor or actuator is disposed exterior to the enclosure. The motor includes a drive shaft coupled to a plurality of guide rods that are in contact with a vertical wall connecting a first planar wall and a second planar wall. The motor or actuator operates at a second temperature different from the first temperature during the flexing. The apparatus includes a jaw secured to the vertical wall, in which the one or more securing screws are oriented symmetrically along the jaw and configured to clamp a material system in the jaw.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only typical aspects of this present disclosure and are therefore not to be considered limiting of its scope, for the present disclosure may admit to other equally effective aspects.

Figure 1:
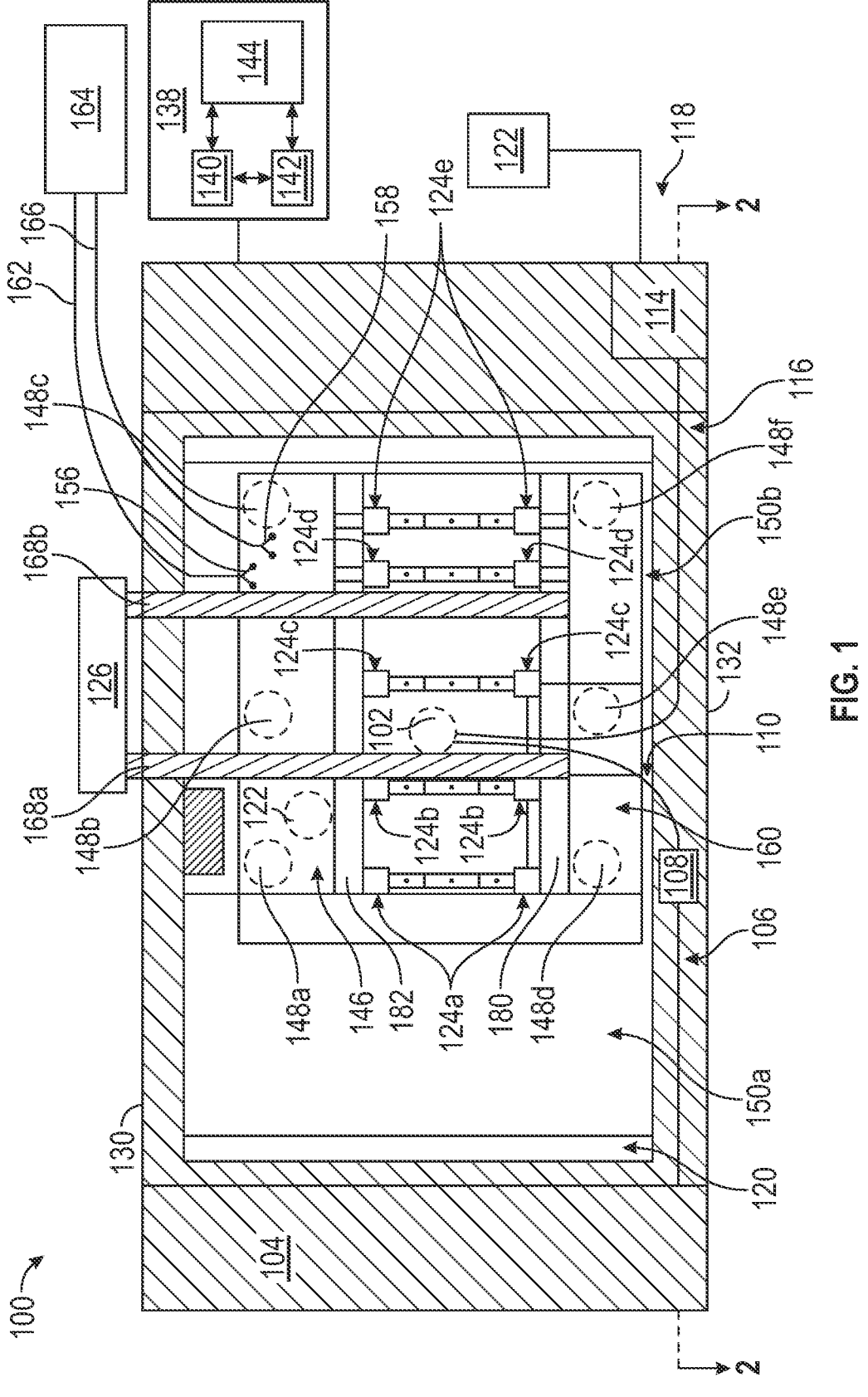
FIG. 1 is a top sectional view of a material testing apparatus for accelerating and controlling the coating failure modes and/or corrosion-related failure modes of a material system, according to an aspect of the disclosure.

To facilitate understanding, identical reference numerals have been used, where possible, to designate identical elements that are common to the figures. The figures are not drawn to scale and may be simplified for clarity. It is contemplated that elements and features of one aspect may be beneficially incorporated in other aspects without further recitation.

DETAILED DESCRIPTION

The descriptions of the various aspects of the present disclosure have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

Conventional chambers that are used to obtain coating and/or corrosion data fail to provide uniform force to the materials. For example, chambers may provide a larger mechanical force to a particular location of a material resulting in simulated corrosion and mechanical data that fails to correlate to real world use. Therefore, there is a need for improved apparatuses and methods for determining operational performance of material systems.

Aspects of the present disclosure generally relate to apparatus and methods for determining operational performance of material systems. A material system can be a component of an aircraft and typically comprises a substrate, such as a metal, and one or more coatings, such as an epoxy, disposed on the substrate. One or more electrodes, such as a pair of electrodes, can be disposed on or within a surface of the material system to provide electrochemical detection of operational performance, e.g. corrosion or coating impedance, of the material system. Determining operational performance of a material system can be performed in a lab setting or on an aircraft by an operator or manufacturer before, during (in situ), or after the material system has been exposed to flexing and/or moisture treatment. For example, a material system can be in electrical communication with a spectrometer to provide impedance data of one or more surfaces of the material system to assist in determination of the operational performance of the material system during flexing and moisture exposure of the material system.

In one aspect, a material testing apparatus includes a chamber configured to control one or more environmental parameters such as humidity, pressure, or temperature. In at least one aspect, the chamber is configured to control humidity, pressure, and temperature. The material testing apparatus further includes a jaw configured to flex a material system. The jaw provides a uniform load distribution across the material by clamping a top portion and bottom portion of the material. The chamber includes a motor or actuator coupled to a draft shaft disposed exterior to the chamber at a first end and a first wall of the chamber at a second end. A motor can be any suitable electric motor, gas powered motor, pneumatic motor or hydraulic motor. An actuator can be any suitable electric actuator, gas powered actuator, pneumatic actuator or hydraulic actuator. A plurality of guide rods coupled to the drive shaft can extend through chamber and contact a mobile beam to provide uniform tension across the material.

Apparatus and methods of the present disclosure provide a controlled humidity environment suitable for deep freeze and high temperature conditions and monitoring of material performance, such as corrosion or coating impedance, on a variety of material systems, such as aircraft material systems, such as panels, coated lap joints between two or more panels, wing-to-fuselage assemblies, or combinations thereof. Material systems, apparatus and methods of the present disclosure provide an ability to replicate in-service, real-world failure modes and mechanisms in a controlled exposure environment, such as under deep freeze and high temperature conditions.

Mechanical flexing of a material system in a material testing apparatus of the present disclosure can provide uniform force such that a smoother and more even load distribution of the material occurs by applying a symmetrical force to the material system in the jaw. The compounding effects of mechanical and chemical stresses combine to induce degradation that more accurately replicates corrosion and coating failures experienced by a material system, such as an aircraft panel, in a real-world environment. Accordingly, methods and apparatus of the present disclosure more accurately simulate the coating failures and corrosion observed with aircraft material systems during real-world use of the aircraft, such as under deep freeze and high temperature conditions. Material systems, methods and apparatus of the present disclosure allow for testing coating degradation and corrosion of stand-alone material systems and the interfaces between coating layers, which more accurately represents the degradation experienced by material systems, such as panels, during actual use of the material systems as part of an aircraft. Material systems, methods and apparatus of the present disclosure further provide re-creation of irregular flight-specific strain profiles so that improved predictive as well as forensic investigations of aircraft material systems may be performed.

Material Testing Apparatus

A material system, such as a panel, may have one or more surface layers such as a surface finish, a primer, and/or a top coat. Corrosion may occur at one or more of these layers in use due to mechanical and chemical stresses. Material systems, apparatus, and methods of the present disclosure provide in situ electrochemical monitoring of impedance to determine corrosion in a setting that mimics the corrosion experienced by a material system in actual use conditions. The material system is subjected to mechanical as well as chemical stresses without degradation of the electrochemical monitoring system. Material systems, apparatus, and methods of the present disclosure provide electrochemical monitoring of impedance to determine corrosion at one or more of a material system surface, a finished surface, a primer surface, and/or a top coat surface.

Figure 2:
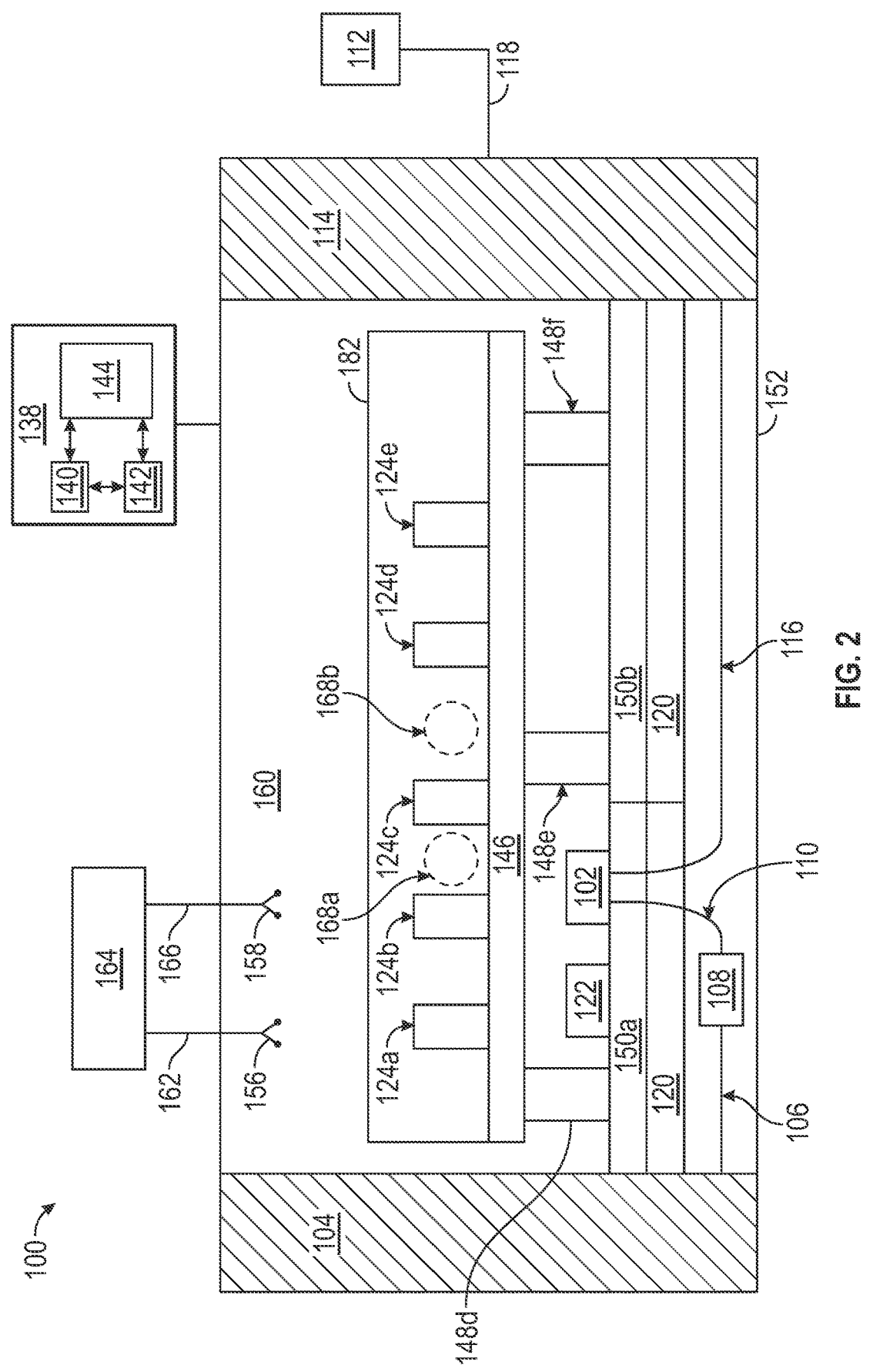
FIG. 2 is a side sectional view of a material testing apparatus for accelerating and controlling the coating failure modes and/or corrosion-related failure modes of a material system, according to an aspect of the disclosure.

FIG. 1 is a plan view of a material testing apparatus 100 for accelerating and controlling the corrosion-related failure modes of a material system, according to an aspect of the disclosure. FIG. 2 is a side perspective view of material testing apparatus 100 of FIG. 1. One or more components of material testing apparatus 100 are made of materials that show resistance to a corrosive environment, such as an environment containing humidity, e.g. a salt fog, an environment containing acidity and/or alkalinity, e.g., an acid or base fog, or combinations thereof. As shown in FIGS. 1 and 2, material testing apparatus 100 includes an enclosure 160 having one or more fog nozzles 102 (one shown) disposed therein and configured to spray a treating liquid, such as a salt fog, in the enclosure 160. A fixture support is disposed in the enclosure to support a material system for exposure and flexing therein. Material testing apparatus 100 includes a liquid reservoir 104 to supply a treating liquid to fog nozzle 102. Fog nozzle 102 may be a nozzle, such as an atomizing nozzle, a nozzle calibrated for air consumption, BETE full cone nozzle, hollow cone nozzle, fan misting nozzle, tank washing spray nozzle, an air-assist nozzle, e.g., NASA Mod1 nozzle for water spray atomization and droplet control, a mist spray nozzle, e.g., a Q-Lab OEM fogging nozzle, spray applicator nozzle, e.g., Cool Clean ChilAire™ Lite, or combinations thereof. Fog nozzle 102 can be made of materials such as hard rubber, plastic, or other inert materials.

The fixture support comprises jaws 124a-f configured to flex a material system. The jaws 124a-f can be configured to flex, e.g., bend, the material system from a first position to a second position that is from greater than 0° to about 180° from the starting position, such as about 5° to about 90°, such as about 5° to about 45°, during a flexing process. Plate 146 is configured to support mobile beam 180 and stationary beam 182, which supports jaws 124a-f. Plate 146 is positioned between fog nozzle 102 and jaws 124a-124f (as shown in FIGS. 1 and 2), allowing treating liquid to enter the enclosure without directly impinging upon a material system held by one or more jaws 124a-f. This configuration mimics general humid atmospheric conditions, as compared to direct rainfall onto an aircraft material system, which allows for accurate modeling of a variety of environments that an aircraft material may be exposed to during operation. Alternatively, jaws 124a-f may be positioned between fog nozzle 102 and plate 146 (this configuration not shown), providing direct flow of treating liquid toward a material system held by one or more jaws 124*a*-*f*. This configuration mimics direct rainfall or aerosol deposition onto an aircraft material system. Fog nozzle 102 may be configured for flow angle adjustment, allowing flow of treating liquid at one or more angles relative to a material system surface. In at least one aspect, a material system surface can be parallel to a principal direction of flow of liquid through material testing apparatus 100, based upon the dominant surface being tested, which reduces liquid collection on a material system during corrosion testing performed in material testing apparatus 100. In such aspects, fog nozzle 102 may be directed or baffled so that the liquid does not impinge directly on a material system. (Fog nozzle 102, a vent 122, a guide rod 168, an outer enclosure 136, and legs 148*a*-*f* are shown as dashed lines in FIG. 1 to indicate that these parts are located behind a plate 146 in the aspect shown in FIG. 1).

A fog pump 108 is configured to assist flow of a liquid from liquid reservoir 104 to fog nozzle 102 via first fluid line 106 and second fluid line 110. First fluid line 106 couples liquid reservoir 104 at a first end with fog pump 108 at a second end to provide liquid communication of liquid reservoir 104 with fog pump 108. Second fluid line 110 couples fog pump 108 at a first end with fog nozzle 102 at a second end to provide liquid communication of fog pump 108 with fog nozzle 102.

A compressed air source 112 and bubble tower 114 are configured to provide humidified air to fog nozzle 102. In at least one aspect, a pressure in the enclosure can be regulated to mimic the pressure experienced by an aircraft at various altitudes during real world use. Accordingly, compressed air source 112 is configured to flow air at a pressure ranging from about 2 pounds per square inch (PSI) to about 50 PSI, from about 5 PSI to about 30 PSI, from about 12 PSI to about 18 PSI. In these ranges, lower pressure values mimic pressures experienced by an aircraft at higher altitudes while higher pressure values mimic pressures experienced by an aircraft at lower altitudes and closer to sea level. Air may include a mixture of gases similar to that found in an ambient atmosphere, for example, comprising about 78% $N_2$, about 21% $O_2$, and about 0.039% $CO_2$, among other gases. Third fluid line 116 couples bubble tower 114 at a first end with fog nozzle 102 at a second end to provide air and liquid communication of bubble tower 114 with fog nozzle 102. A compressed air line 118 couples compressed air source 112 at a first end with bubble tower 114 at a second end to provide air communication of compressed air source 112 with bubble tower 114. Bubble tower 114 can contain a liquid, such as aqueous fluids or organic fluids. For example, bubble tower 114 can include a hydraulic fluid, hydrocarbon fluid, water, or any other suitable liquid suitable for providing humidification. Bubble tower 114 can provide initial humidification or additional humidification to air flowed from compressed air source 112 via compressed air line 118.

A vent 122 can be coupled with the first wall 130, a second wall 132, or a third wall 152 (FIG. 2) to provide pressure regulation inside of material testing apparatus 100. A heater 120 may be provided and configured to regulate the temperature inside of material testing apparatus 100 such as enclosure 160. Heater 120 can be disposed adjacent to a first wall 130 of material testing apparatus 100 and coupled with third wall 152 (FIG. 2). Heater 120 may be mounted to third wall 152 by any suitable mounting element, such as rivets. Heater 120 may be coupled with and controlled by controller 138.

A fixture support comprising one or more jaws is configured to support and flex a material system positioned in the enclosure for testing. Jaws 124*a*, 124*b*, 124*c*, 124*d*, and 124*e*, support the material system by clamping a top portion and bottom portion of the material system to ensure uniform pressure along a side of the material. Without being bound by theory, the uniform pressure can allow jaws 124*a*, 124*b*, 124*c*, 124*d*, and 124*e* to uniformly flex a material system, such as a panel, a coated lap joint between two metal panels, a wing-to-fuselage assembly, or combinations thereof. The material system may be an aircraft material system, such as a panel, such as a skin or fuselage flat panel. The material system can have a width that is, for example, about 4 inches, and a length that is for example, about 6 inches to about 14.5 inches. The fixture support can flex a material system to a strain ranging from about 0.05% to about 50%, about 0.1% to about 30%, about 0.3% to about 5%, such as about 0.37%.

Jaws 124*a*-*f* are configured to flex a material system from a first starting position to a fully or partially flexed second position. Jaws 124*a*-*f* are configured to flex a material system from a first position to a second position that is from greater than 0° to about 180° from the starting position, such as about 5° to about 90°, such as about 5° to about 45°, during a flexing process. Jaws 124*a*-124*e* can be the same size or different sizes. For example, jaw 124*a* may be the same size as jaw 124*b*, but be a different size than jaw 124*d* (as shown in FIG. 1). Furthermore, jaws 124*a*-124*e* can be positioned from one another by a distance that is the same or different than a distance between a different pair of jaws 124*a*-*f*. For example, a first distance between jaw 124*a* and 124*b* may be different than a second distance between jaw 124*d* and 124*e*. Various jaw sizes and various distances between jaws provide, for example, simultaneous testing of different sized material systems, such as panels, during an exposing and flexing process within material testing apparatus 100. In at least one aspect, one or more of jaws 124*a*-*f* comprises steel. In at least one aspect, one or more of jaws 124*a*-*f* comprises a material resistant to corrosion, e.g., titanium. In at least one aspect, one or more of jaws 124*a*-*f* is anodized. In at least one aspect, one or more of jaws 124*a*-*f* comprises an inert material such as hard rubber and/or plastic. One or more of jaws 124*a*-*f* can comprise an insulating material, such as a polyethylene (e.g., high density polyethylene (e.g., a density of 0.94 $g/cm^3$ or greater)) and/or fiberglass, to provide maintenance of the temperature of the jaws (and the material systems) independent of the temperature of the motor 126. In such aspects, the temperature of jaws 124*a*-*f* can be maintained at a desired temperature, e.g., about −196° C. to about 100° C., while motor 126 is also maintained at a desirable temperature, e.g., about −30° C. to about 50° C., as described in more detail below.

In at least one aspect, jaws 124*a*-*f* are configured to support a material system, such as a panel, from about 15° to about 30° relative to a first wall 130 and/or second wall 132, which reduces liquid collection on a material system during corrosion testing performed in material testing apparatus 100, providing enhanced modeling of a material system by resembling an orientation that can be used during operation. In at least one aspect, jaw 124*a* is configured to grip a material system at a first end of the material system and jaw 124*b* is configured to grip the material system at a second end of the material system. In at least one aspect, jaws 124*a*-*f* are configured to flex a material system simultaneously and/or alternatively, which may provide additional modeling parameters of the material system.

A motor 126 operates jaws 124*a*-*f*. Motor 126 is disposed exterior to the first wall 130, in which a drive shaft 402 is coupled to a guide rod 168, as described below. Guide rod 168 extends through one or more chamber walls and is coupled with the jaws 124*a-f*. The guide rod 168 may provide one or more tension or compression forces on the jaws 124*a-f*. The guide rod can be a material that is resistant to environmental-based corrosion such as humidity, salt, pressure, or a combination thereof. For example, the guide rod 168 may be titanium. The guide rod 168 extends through the one or more chamber walls and couples with the jaws 124*a-f* such that moving parts of motor 126, e.g., actuators, drive shafts, or bearings, are located external to the chamber, which can reduce corrosion of the moving parts of the motor. Without being bound by theory, this allows for reduced maintenance and reduced chamber malfunctions as the movable components, such as the drive shaft are not exposed to the corrosive environment.

Jaws 124*a-f* are supported by plate 146. Plate 146 is supported by legs 148*a*, 148*b*, 148*c*, 148*d*, 148*e*, and 148*f*. Legs 148*a-f* are coupled with plate 146 at a first end and a chamber wall, a rack 150*a*, or a rack 150*b* at a second end. Plate 146 can be disposed between the enclosure 136 and jaws 124*a-f*. Plate 146 can be made of an insulating material, such as a polyethylene (e.g., high density polyethylene) and/or fiberglass, to provide a temperature control barrier between motor 126 and jaws 124*a-f*. In such aspects, the temperature of jaws 124*a-f* can be maintained at a desired temperature internal to the chamber while motor 126 is also maintained at a desirable temperature external to the chamber.

Motor 126 translates bending motion inside the chamber via the guide rod 168 using a drive shaft 402. The drive shaft 402 can include a screw, such as a ball screw, Acme screws, Lead screws, Roller screws, and screw mount, or an axle coupled with jaws 124*a-f*. The guide rod 168 maintains spacing between stationary beam 182 and mobile beam 180 during flexing, as described in more detail below.

Apparatus and material systems of the present disclosure include one or more electrodes, such as one or more pairs of electrodes. An electrode may be coupled with a substrate (to form a material system) and subsequent use of material testing apparatus 100 to test operational performance of the material system. During flexing, the center portion of the material system will experience more strain than the edges of the material system. Accordingly, a pair of electrodes disposed on the same side of the material system provides detecting impedance across the same side of the material system.

As shown in FIGS. 1 and 2, material testing apparatus 100 includes electrode pairs 156 and 158. Although electrode pairs are shown in FIGS. 1 and 2, in an alternative aspect, material testing apparatus 100 comprises single electrodes. Electrode pair 156 is configured to couple with a first side of a material system (not shown), and electrode pair 158 is configured to couple with a second side of the material system (not shown). Electrodes can be made of conductive epoxy, nickel, gold, silver, copper, platinum, palladium, or mixtures thereof. In at least one aspect, at least one electrode is conductive epoxy, such as the electrodes of pairs 156 and/or 158. In at least one aspect, conductive epoxy is conductive silver epoxy, providing enhanced conduction compared to other transition metals. Electrode pair 156 is coupled with spectrometer 164 via electrical line 162 to provide electrical communication between electrode pair 156 and spectrometer 164. Furthermore, electrode pair 158 is coupled with spectrometer 164 via electrical line 166 to provide electrical communication between electrode pair 156 and spectrometer 164. Electrical lines 162, 166 can be insulated wire (e.g., insulated steel wire) or wire having insulated conductive tape. Electrode pair 156 is configured to couple with a first side of a material system, and electrode pair 158 is configured to couple with a second side of the material system, as described in more detail below. In at least one aspect, spectrometer 164 comprises a potentiostat, galvanostat, and/or zero-resistance ammeter. Spectrometer 164 can be an electrochemical impedance spectrometer, such as a Reference600 supplied by Gamry Instruments or a VMP300 supplied by Bio-Logic Science Instruments. When coupled with a material system, electrodes (e.g., electrode pairs 156 and 158) detect an electrical signal from the material system and transmit the electrical signal to a spectrometer, such as spectrometer 164. Spectrometer 164 is configured to interpret the electrical signal to provide electrical data, such as impedance, regarding the condition, such as corrosion, of the material system. Electrochemical impedance is usually measured by applying an AC potential to an electrochemical cell and then measuring the current through the cell. The response to this potential, e.g. sinusoidal potential, is an AC current signal. This current signal can be analyzed as a sum of sinusoidal functions (a Fourier series). Electrochemical impedance is normally measured using a small excitation signal. This is done so that the cell's response is pseudo-linear. In a linear (or pseudo-linear) system, the current response to a sinusoidal potential will be a sinusoid at the same frequency but shifted in phase. EIS data are typically analyzed in terms of an equivalent circuit model. Echem Analyst [a Gamry software product] finds a model whose impedance matches the measured data.

Parts of material testing apparatus 100 described herein can comprise materials that are suitably inert to conditions within material testing apparatus 100 during a cyclic flexing fog spray process. Suitably inert materials may include a polyethylene (e.g., high density polyethylene), fiberglass, plastic, glass, stone, metal, rubber, and/or epoxy. Other materials that may be used to fabricate parts of one or more parts of material testing apparatus 100 include high density polypropylene, commercial grade Titanium (II) with polyethylene insert, stainless steel with polyethylene insert, and combinations thereof.

Material testing apparatus 100 can be controlled by a processor based system controller such as controller 138. For example, the controller 138 may be configured to control material testing apparatus 100 parts and processing parameters associated with a cyclic flexing fog spray process. The controller 138 includes a programmable central processing unit (CPU) 140 that is operable with a memory 142 and a mass storage device, an input control unit, and a display unit (not shown), such as power supplies, clocks, cache, input/output (I/O) circuits, and the like, coupled to the various components of the material testing apparatus 100 to facilitate control of a cyclic flexing fog spray process. Controller 138 can be in electronic communication with, for example, outlet tube 134, vent 122, heater 120, and/or jaws 124*a-f*.

To facilitate control of the material testing apparatus 100 described above, the CPU 140 may be one of any form of general purpose computer processor that can be used in an industrial setting, such as a programmable logic controller (PLC), for controlling various chambers and sub-processors. The memory 142 is coupled to the CPU 140, and the memory 142 is non-transitory and may be one or more of readily available memory such as random access memory (RAM), read only memory (ROM), floppy disk drive, hard disk, or any other form of digital storage, local or remote. Support circuits 144 are coupled to the CPU 140 for supporting the processor in a conventional manner. Information obtained from cyclic flexing fog spray processes with material testing apparatus 100 may be stored in the memory 142, typically as a software routine. The software routine may also be stored and/or executed by a second CPU (not shown) that is remotely located from the hardware being controlled by the CPU 140. The memory 142 is in the form of computer-readable storage media that contains instructions, that when executed by the CPU 140, facilitates the operation of the material testing apparatus 100. The instructions in the memory 142 are in the form of a program product such as a program that implements a process of the present disclosure. The program code may conform to any one of a number of different programming languages. In at least one aspect, the disclosure may be implemented as a program product stored on computer-readable storage media for use with a computer system. The program(s) of the program product define functions of the aspects (including the methods described herein). Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the methods and apparatus of the present disclosure, are aspects of the present disclosure.

Figure 3:
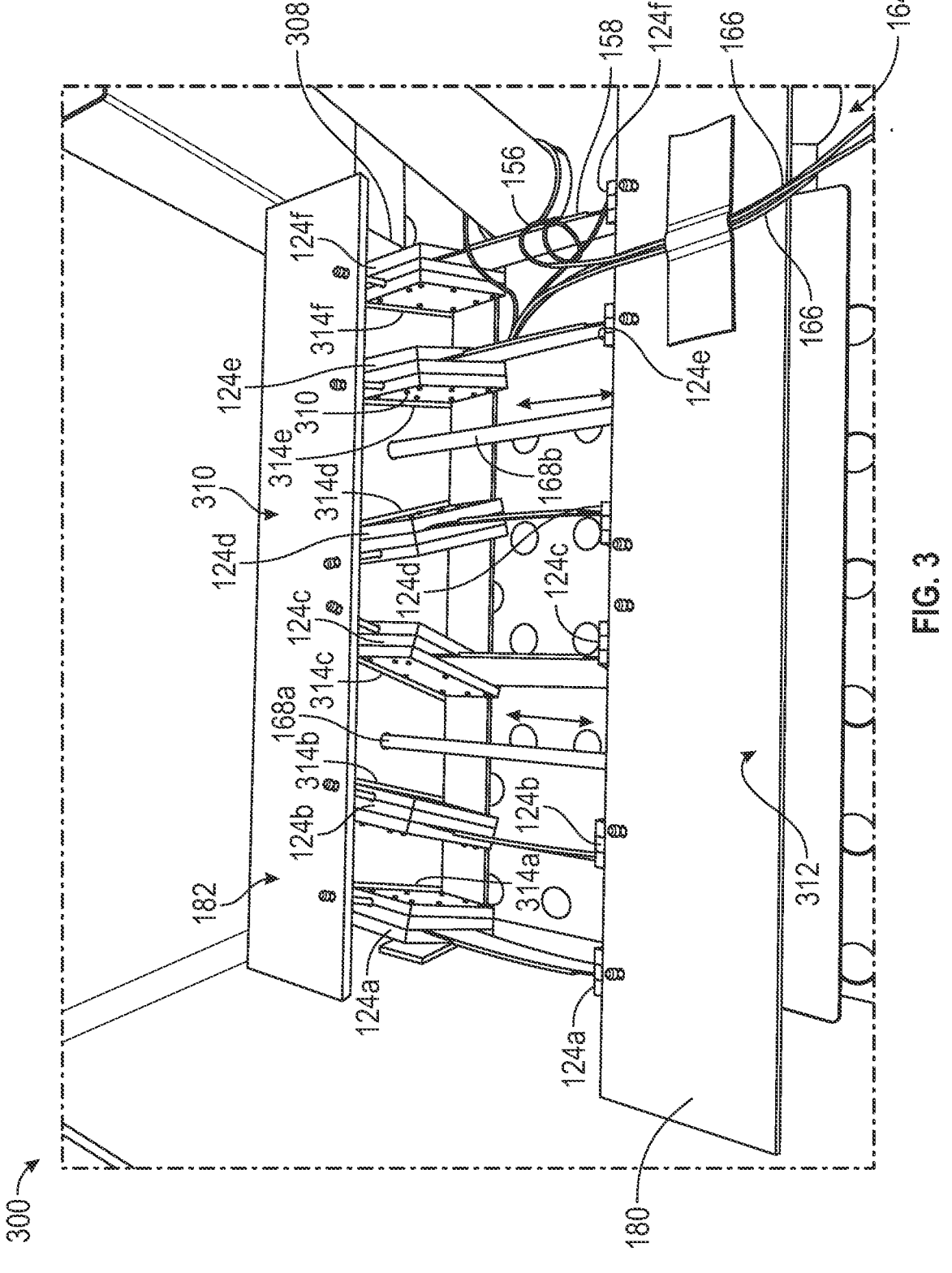
FIG. 3 is a perspective view of a flexor, according to an aspect of the disclosure.

FIG. 3 is a perspective view of a flexor 300 configured to perform cyclic flexing, according to an aspect of the disclosure. Flexor 300 can be located inside of a material performance chamber, such as material testing apparatus 100 as described for FIG. 1. As shown in FIG. 3, flexor 300 includes a mobile beam 180 and a stationary beam 182. Stationary beam 182 can be mounted to plate 146 by one or more mounting bolts. Mobile beam 180 is slidably disposed on plate 146 adjacent to stationary beam 182. Without being bound by theory the flexor 300 having a mobile beam 180 and stationary beam 182 provides a uniform application of force on a material secured between the beams. Linear displacement between stationary beam 182 and mobile beam 180 is maintained by guide rods 168a and 168b. Guide rods 168a and 168b may comprise titanium, stainless steel, high density polypropylene, high density polyethylene, chromium, such as an Armology® coating, and combinations thereof. Each of guide rods 168a and 168b is coupled with stationary beam 182 and mobile beam 180. Guide rods 168a and 168b are parallel to one another. While only two guide rods 168a and 168b are shown in FIG. 1, any suitable number of guide rods may be implemented, e.g., about 1 guide rod to about 10 guide rods, e.g., about 1 to about 3, about 3 to about 5, about 5 to about 7, or about 7 to about 10. Without being bound by theory, two or more guide rods can reduce a bending of the mobile beam or stationary beam, which can produce a smoother and more even load distribution between testing stages as compared to an apparatus having a singular guide rod. Without being bound by theory, longer guide rods 168a and 168b may provide a more uniform force distribution across the plurality of materials disposed in the jaws 124a-f. Alternatively, shorter guide rods 168a and 168b can provide uniform loads across the plurality of materials disposed in the jaws 124a-f.

Stationary beam 182 and mobile beam 180 mount or otherwise support jaws 124a-f. Stationary beam 182 mounts a first side of jaws 124a-f in a stationary position during flexing, while mobile beam 180 mounts a second side of jaws 124a-f and allows movement of the second side of jaws 124a-f during flexing. Stationary beam 182 and mobile beam 180 may comprise high density polyethylene. During flexing, the mobile beam is shifted laterally relative to the stationary beam from a starting point to an end point resulting in flexing of the material system positioned in jaws 124a-f. The starting point, end point, and shift distance may be controlled by a user of flexor 300 based on test fixture mechanical boundary limits, mechanical stop blocks, or fixture driving system software controls.

Each of stationary beam 182 and mobile beam 180 includes a first planar wall 310 and a second planar wall 312 separated by a vertical wall 308, which can form an I-beam structure, e.g., an I-beam, a joist, a truss, a rafter, or a tiebeam. The first planar wall 310 and the second planar wall 312 can be parallel with each other. Without being bound by theory, an I-Beam structure can increase stiffness, resulting in an even distribution of stresses to each test material. The vertical wall 308 includes a plurality of attachment locations 314a-f, in which each attachment location can allow each of the jaws 124a-124f to be mounted to the vertical wall 308. The attachment location may be rectangular, angled, or a combination thereof to provide an angle in which each of the jaws 124a-f can be mounted. The attachment locations 314a-f can be situated centered with respect to the two or more guide rods, which can minimize torque in the Y axes associated with the positions, providing uniform bending of the material system. Additionally, the attachment locations 314a-f can be symmetrical with respect to the center of the stationary beam or mobile beam to reduce any torque in the Z axis. The location of the attachment locations 314a-f, being centered with respect to the two or more guide rods, allows for a uniform force to be exerted on the jaws 124a-124f when the mobile beam 180 moves toward the stationary beam 182, creating a compression of the material.

The jaws 124a-f include one or more securing screws 310 that clamp an end of the material within the jaws 124a-f. The one or more securing screws 310 provide a uniform force across the material such that the material is evenly secured within the jaws 124a-f. Without being bound by theory, by securing the material using the securing screws 310 on both the top and bottom of the material, a uniform force will be applied on both the top and bottom of the material. One side of the material will be prevented from having a larger force exerted, which would otherwise result in an improper simulation on the material. Jaws 124a-f can be hinged, which allows bending of a material system while compressing the material system. For example, jaws 124a-f may be mounted on one side of each attachment location on a vertical wall 308 and disposed at an angle from, for example, 15° to 30° relative to a line perpendicular to the base. Other angles relative to perpendicular are contemplated to achieve a desired testing condition for a material panel. The angle of jaws 124a-f determines the angular position of the material system. In at least one aspect, a material system is disposed at an angle from, for example, 15° to 30° relative to a line perpendicular to the base.

In at least one aspect, jaws 124a-f are non-conductive and non-metallic so as to have little or no galvanic effect on the material system. One or more of jaws 124a-f may comprise high density polyethylene, commercial grade Titanium (II) with polyethylene insert, sacrificial 316SS with polyethylene insert, or combinations thereof, which prevents (partial or complete) galvanic corrosion of the jaws and material systems during testing. One or more of jaws 124a-f can comprise a sleeve cover comprising, for example, polyethylene, which further prevents galvanic corrosion of the jaws and material systems during testing. Electrode pair 158 of material testing apparatus 100 is directly disposed on a first side of a material system disposed in jaw 124*f*, and electrode pair 156 (not shown) of material testing apparatus 100 is disposed on a second side of the material system opposite the first side. A non-conductive protective coating 512 can be disposed on electrode pairs 158 and 156 to protect the electrodes from a corrosive environment while material testing apparatus 100 is in use, e.g. testing the material system, as described below. Non-conductive protective coatings include non-conductive epoxy, tape, adhesive, sealant, or mixtures thereof. For example, a non-conductive epoxy can be a 2-part waterproof epoxy.

Although FIG. 3 shows electrodes 156 and 158 directly disposed on a material system disposed in jaw 124*f*, it is to be understood that material systems (and apparatus) of the present disclosure embrace aspects where one or more electrodes and/or electrode pairs are not directly disposed on material systems disposed in one or more of jaws 124*a-f*, and the electrodes and/or electrode pairs can be in electrical communication with spectrometer 164 via electrical lines similar or identical to electrical lines 162, 166. Such aspects provide electrochemical in situ monitoring of a plurality of material systems within a material performance chamber, such as material testing apparatus 100. Furthermore, a non-conductive protective coating can be disposed on said electrodes and/or electrode pairs, as described below.

A flexor, such as flexor 300, can provide variable displacement of a mobile beam and material systems at variable frequencies that are adjustable in real-time. A flexor can also provide for application of tension and compression to a material system, while exposing the material to one or more environmental conditions. Without being bound by theory the flexor 300 can increase stiffness of the mobile beam and stationary beam compared with previous material systems while simplifying assembly and reducing cost. Additionally, symmetry of the panels position can distribute the load uniformly without significant bending of the beam as well as in the absence of motor moving parts interior to the chamber exposing the material to one or more environmental conditions. As such, reduction of wear and risk of corrosion can be achieved, which reduces maintenance and down time of the apparatus.

In at least one aspect of the present disclosure, a material performance chamber contains more than one flexor 300. In at least one aspect where a material performance chamber contains more than one flexor 300, guide rods 168*a* and 168*b* extend through multiple flexors 300.

Figure 4:
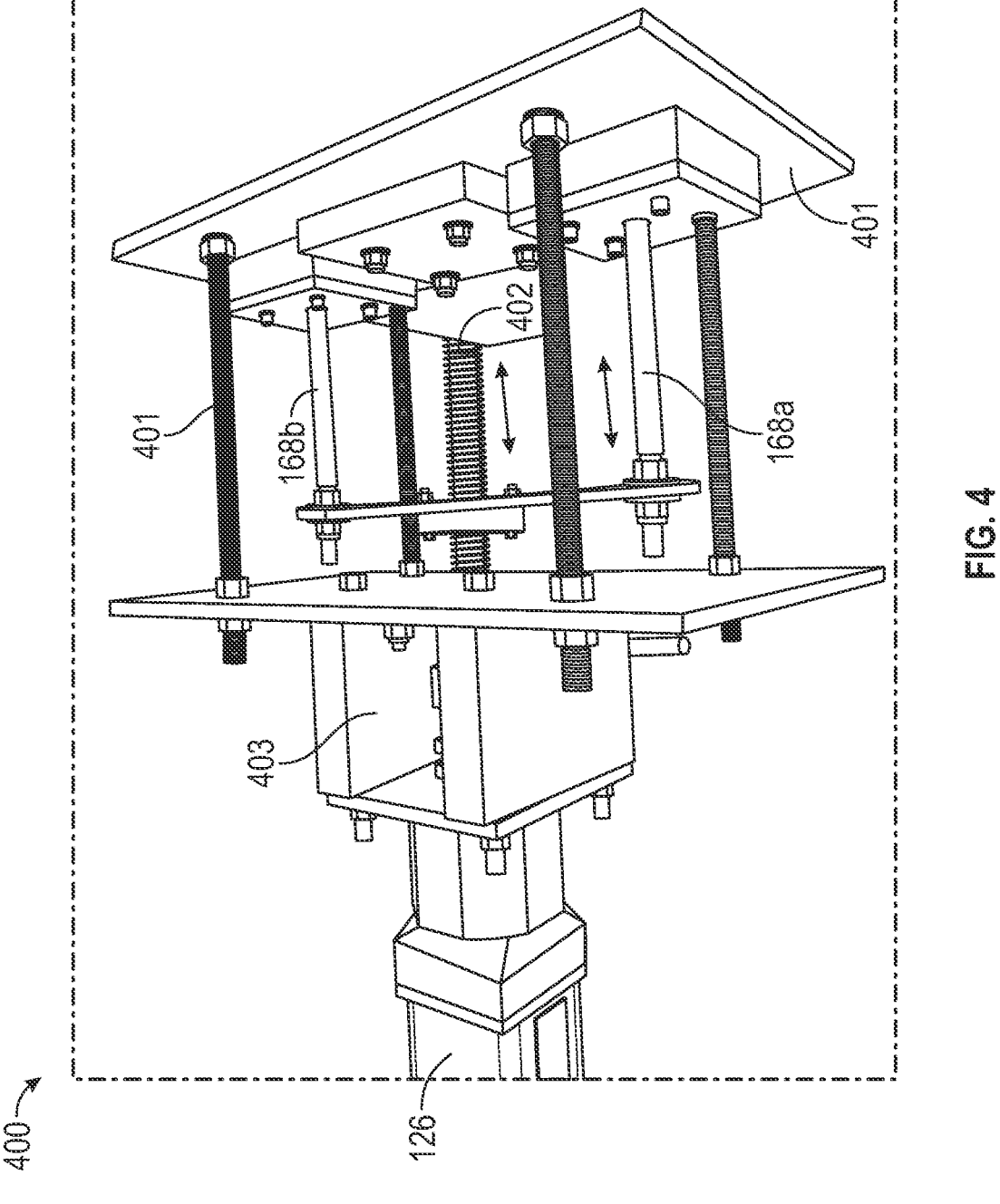
FIG. 4 is a perspective view of a motor, according to an aspect of the disclosure.

FIG. 4 is a perspective view of a motor 400 configured to provide a tensile or compressive force to the flexor 300, according to an aspect of the disclosure. A support structure 401 is disposed next to the chamber. The support structure 401 can be configured to support one or more inlets or outlets coupled to the chamber without providing load to the chamber. Two or more guide rods 168*a* and 168*b* are disposed between the support structure and the motor 126. The two or more guide rods 168 may extend or retract along a first axis such that the guide rods provide a tensile or compressive force on the flexor (not shown). The guide rods 168 extend or retract due to the motor 126 operating a drive shaft 402. The drive shaft 402 can translate motor rotation into linear motion, e.g., longitudinal motion, which extends or retracts the guide rods 168. In some embodiments, a plurality of drive shafts 402 may be incorporated to promote a smooth linear motion of the guide rods 168. The motor 126 can be coupled to an aligner 403. The aligner 403 can provide for easier alignment of the guide rods 168 through the chamber.

Without being bound by theory, reduced corrosion and damage to the motor and/or motor moving parts occurs because all the motor moving parts are disposed external to the chamber, which can lower maintenance, wear, and reduces downtime.

Material Systems

In at least one aspect, a material system that includes a metal panel that includes a coating disposed over the metal panel. The coating may include an epoxy coating, as described below. The metal panel can be flat. The material performance, e.g., the metal panel properties, the coating properties, the adherence of the coating to the metal panel, or a combination thereof, of the flat panel is tested by cyclically flexing the material system while exposing the panel to at least a cycle of humidity, e.g. salt fog. Before, during, and/or after exposure and flexing, the material system is assessed for corrosion onset, rate of propagation, and performance.

In at least one aspect, a material system comprises a substrate having two flat metal panels connected, joined, welded, bonded, or fastened together using metallic fasteners, screws, bolts, or other hardware, before being exposed to at least a cycle of salt fog, to provide enhanced modeling and improved design of areas of an aircraft that can be susceptible to aircraft wear and tear.

In at least one aspect, a material system comprises a mechanical joint or knuckle joint that may be made of metallic or composite materials and coated before being exposed to a cyclic salt fog and/or before being assessed for corrosion onset, rate of propagation, and performance, to provide enhanced modeling and improved design of areas of an aircraft that can be susceptible to aircraft wear and tear.

In at least one aspect, a material system comprises a structural system replicative of aircraft components, representing a side-of-body joint, a stringer-to-fuselage assembly, a fuselage panel, or wing spar-to-fuselage assembly. The produced assemblies may be actuated or flexed while being exposed to at least a cycle of salt fog before/while being assessed for corrosion onset, rate of propagation, and performance, as described herein, to provide enhanced modeling and improved design of areas of an aircraft that can be susceptible to aircraft wear and tear.

Figure 5:
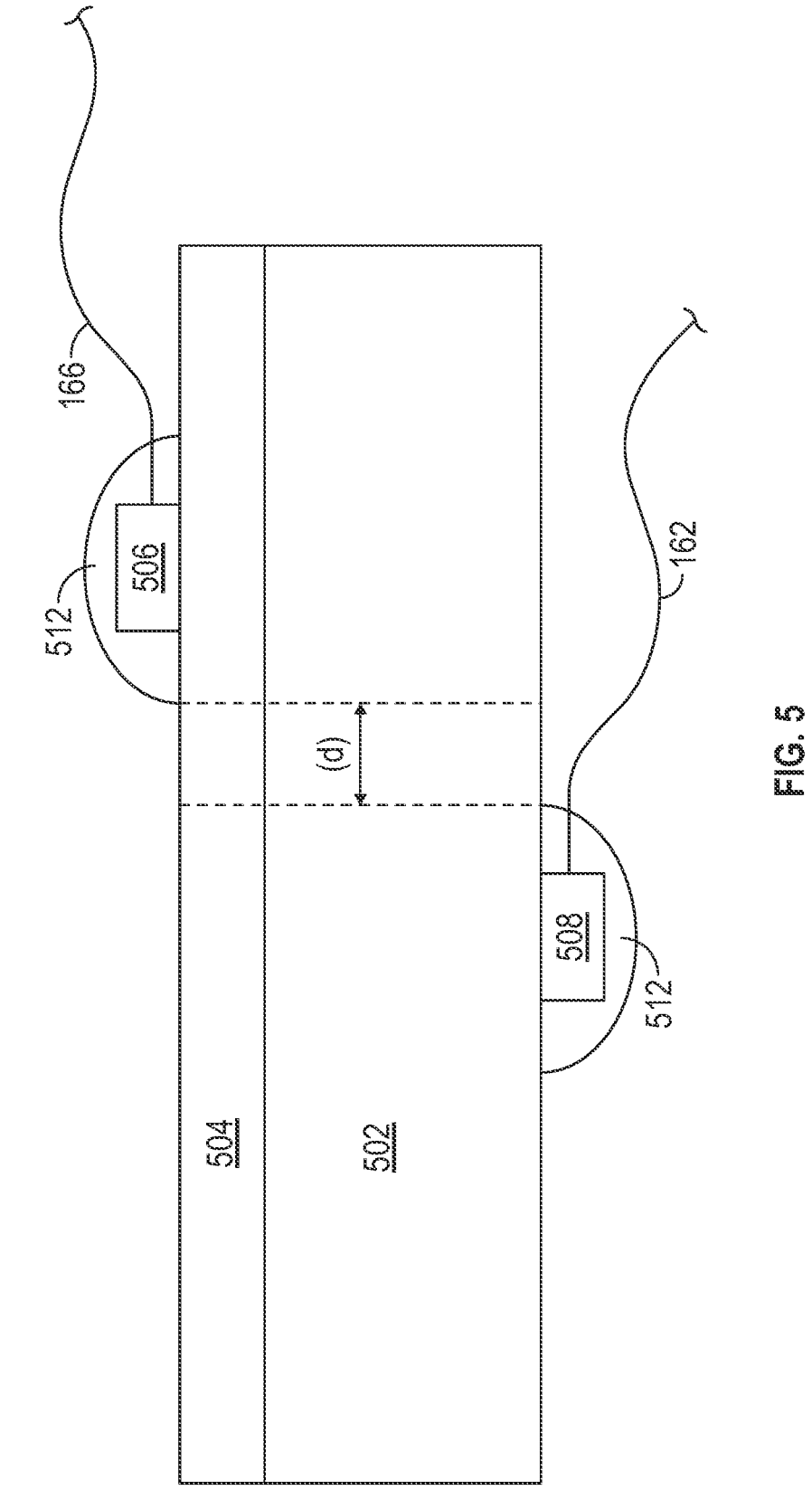
FIG. 5 is a side view of a material system, according to an aspect of the disclosure.

FIG. 5 is a side view of a material system 500 depicting material system 500 comprising a conductive metal substrate 502 and a coating layer 504 disposed on substrate 502. Metal substrate 502 can be made of titanium, aluminum, copper, or alloys thereof. Metal substrate 502 may be coated with one or more primers, such as a chromated primer, surface finishes and/or top coats. For example, coating layer 504 can be made of chromated primer, epoxy primer, urethane primer, or mixtures thereof. Electrode 506 (which can be part of an electrode pair such as electrode pair 158) is directly disposed on coating layer 504 and is a reference electrode. Electrode 508 (which can be part of an electrode pair such as electrode pair 156) is disposed on the metal substrate 502 and is a working electrode. In at least one aspect, an insulating adhesive, such as non-conductive epoxy, is disposed between electrode 508 and metal substrate 502. For spectroscopic measurements during testing, the working electrode 508 is adhered to conductive metal substrate 502, and an electrical signal is sent through the working electrode (or pair of electrodes). The signal then moves through coating layer 504 and is received by electrode 506 (of electrode pair 158) and transmitted to spectrometer 164. In an alternative aspect, working electrode 508 and reference electrode 506 is each disposed (e.g., directly disposed) on coating layer 504.

In aspects where a coating layer, such as coating layer 504, is made of an epoxy and an electrode disposed on the coating layer is made of a conductive epoxy, it has been discovered that the epoxy materials of the coating layer and the electrode absorb to one another. Alternatively, an electrode is or contains nickel, which can provide increased conduction of electrons across the electrode. Use of an adhesive to adhere the two materials together is optional such that the electrode is directly disposed on the coating layer. In such aspects, a surface of the coating layer can be lightly abraded, followed by applying the electrode directly to the abraded surface. In the case of epoxy electrodes, this "like-on-like" interaction between coating layer and electrode improves compatibility of the interface of the electrode and coating layer. The improved compatibility between the electrode and coating layer improves thermal and mechanical properties between the coating layer and the electrode. Conventional electrodes are operably connected to a substrate surface with non-conductive adhesives. These adhesives interfere with the electrical communication of the electrode and a substrate such as a coating layer, yielding inaccurate spectroscopic data. With use of such adhesives, the electrical properties of the material system are being affected by a component (the adhesive) that is not a component of a material system that would likely be used in commercial applications of the material system. The adhesive causes a sharp gradient in mechanical, chemical, and thermal performances of the material system where the electrode is located. The improved compatibility between electrodes and coating layers of material systems of the present disclosure provides homogeneity between the electrodes and coating layers yielding reduced noise observed in a spectroscopic signal.

As a comparative example to material systems having epoxy electrodes, a material system having metal electrodes deposited onto a coating layer was tested. Electrochemical monitoring of the material system having metal electrodes deposited onto a coating layer provided an EIS spectrum showing only an "air" curve, indicative of an insufficient interaction between the metal electrodes and the coating layer. As used herein, "air curve" indicates an open-lead experiment. This experiment records an EIS spectrum with no cell attached. The spectrum from an open-lead experiment looks very much like a noisy spectrum for a parallel RC network. So, when an air curve is observed in the data, the leads from the spectrometer are not making electrical contact with the coating, and an EIS spectrum of the open air (i.e. an "air curve) is being collected.

Furthermore, it has been discovered that the thickness of electrodes of a material system can affect spectroscopic results of electrochemical monitoring. Electrodes of the present disclosure, such as electrodes 506 and 508 of electrode pairs 156 and/or 158, can have a thickness of about 20 micrometers ($\mu m$) or less, such as about 12 micrometers or less. For example, electrodes having a thickness of about 12 $\mu m$ or less provide flexibility of the electrodes disposed on and/or within a material system and provide material systems operable to have an electrode disposed on one or more layers of the material system for more accurate electrochemical monitoring of each of the one or more layers of a material system. In at least one aspect, electrodes of the present disclosure have a thickness of from about 1 $\mu m$ to about 12 $\mu m$, such as from about 2 $\mu m$ to about 11 $\mu m$, such as from about 3 $\mu m$ to about 10 $\mu m$. In at least one aspect, a coating layer of the present disclosure has a thickness of from about 1 $\mu m$ to about 500 $\mu m$, such as from about 2 $\mu m$ to about 250 $\mu m$, such as from about 3 $\mu m$ to about 100 $\mu m$, such as from about 4 $\mu m$ to about 15 $\mu m$. Furthermore, the reduced size of the electrodes of the present disclosure provides smaller/thinner electrical wires (coupled with the electrodes at a first end and a spectrometer at a second end) to be used for material systems of the present disclosure, as compared to traditional electrical wires that are too large to be embedded within layers of a multilayered material system.

In comparison, an electrode having a thickness of 13 $\mu m$ or greater (such as interdigitated electrodes) is more rigid than thinner electrodes and tends to disconnect from the material system during flex testing. The rigidity of thick electrodes hinders the electrode's ability to conform to a surface of the material system. Furthermore, if a conventionally thin coating layer (such as an assembly primer, interior primer, fuel tank primer) is disposed on an electrode, electrodes having a thickness of 13 $\mu m$ or greater tend to create a defect in the overlying layer and the defect is then accentuated over the course of flex testing. Furthermore, some conventional electrode designs involve drilling through the substrate to embed electrodes within a layer. Such embedded electrodes have similar drawbacks as described for thick electrodes.

In at least one aspect, electrodes of a material system of the present disclosure are offset from one another. For example, as shown in FIG. 5, electrodes 506 and 508 are offset from one another by a distance (d). Offsetting the electrodes of material systems of the present disclosure reduces moisture effects because an electrical signal flows where the electrons have the least resistance. If the electrodes are not offset from one another, then the area under the reference electrode is shielded from absorbing electrolyte from moisture. As moisture content within a coating increases (e.g., in the cracks/crevices) during testing, the accuracy of electrical data is improved because of the relatively high dielectric constant of water and saline as compared to the dielectric constant of most intact coatings. For example, the electrodes themselves are protected from moisture or the electrical signal may be inaccurate. Protecting an electrode from moisture may be accomplished by sealing an electrode with a protective coating 512, such as a non-conductive epoxy.

Figure 6:
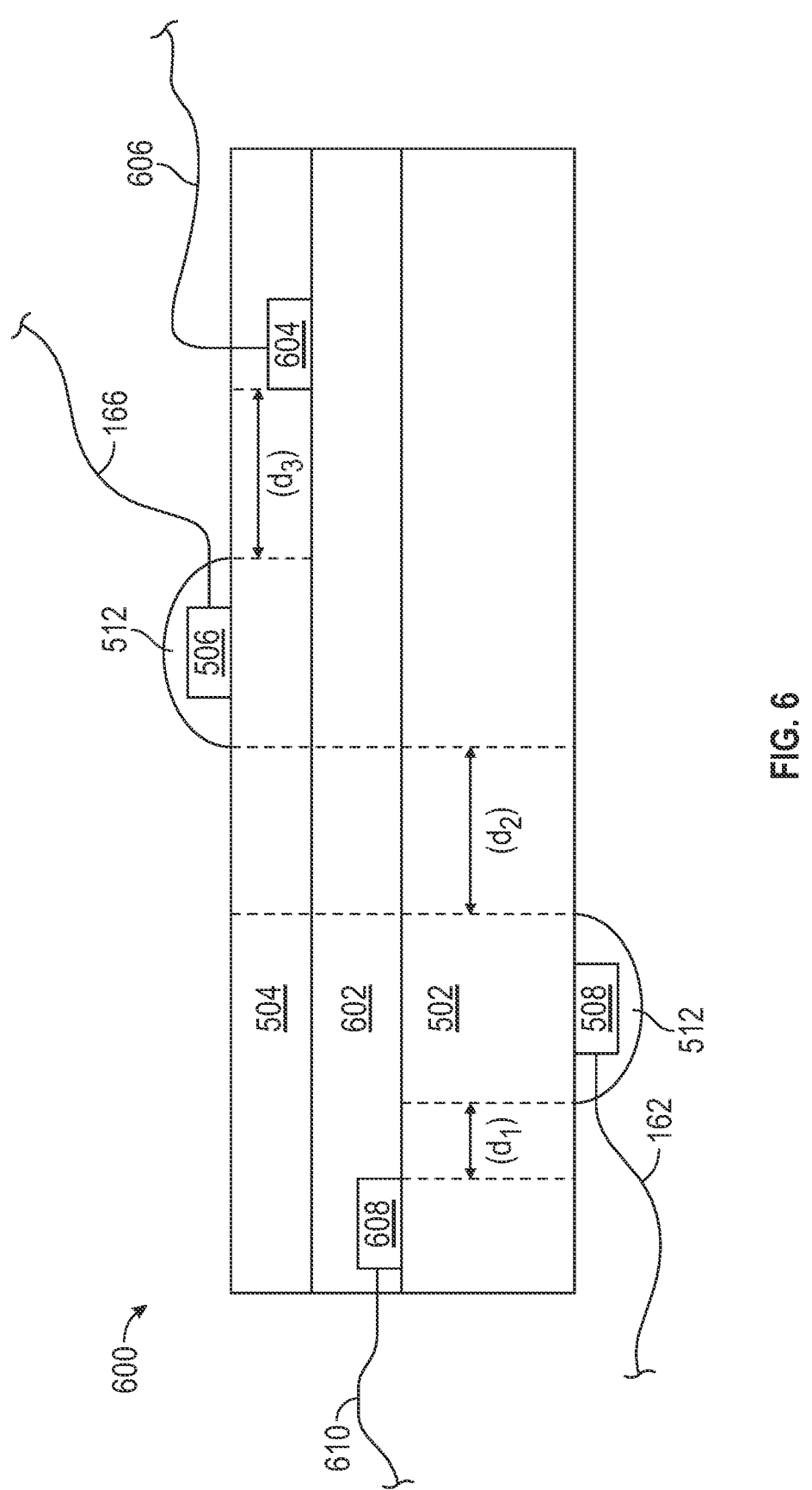
FIG. 6 is a side view of a material system, according to an aspect of the disclosure.

FIG. 6 is a side view of a material system 600, according to an aspect of the present disclosure. As shown in FIG. 6, material system 600 is a multilayered material system comprising metal substrate 502, a first coating layer 602, and a second coating layer 504. Electrode 608 (which can be of an electrode pair) is disposed on metal substrate 502 and is in electrical communication with a spectrometer, such as spectrometer 164, via electrical line 610. Furthermore, electrode 604 (which can be of an electrode pair) is disposed on first coating layer 602 and is in electrical communication with a spectrometer, such as spectrometer 164, via electrical line 606. A protective coating (not shown) can be disposed on one or both of electrodes 608 and 604 before depositing a subsequent coating layer onto the electrodes and substrate. As shown in FIG. 6, electrodes 608 and 604 are internal to (e.g., embedded) the material system. Internal electrodes provide in situ electrochemical monitoring of individual layers of a material system at a coating/substrate interface of a multilayered material system to determine corrosion. In at least one aspect, an insulating adhesive, such as non-conductive epoxy, is disposed between electrode 608 and metal substrate 502.

As shown in FIG. 6, electrode 608 and electrode 508 are offset by a distance $(d_1)$. Electrode 508 and 506 are offset by a distance $(d_2)$, where electrode 508 and 506 are protected by a protective coating 512. Protective coating 512 is also disposed on electrical line 166 and/or electrical line 162 to further protect electrical line 166 and/or 162 during flexing and/or salt fog exposure. Electrode 506 and electrode 604 are offset by a distance $(d_3)$. $(d_1)$, $(d_2)$, and $(d_3)$ are sized to prevent polarizing an electrode, which would otherwise move away from the pseudo-linear portion of a voltage-current response curve. In at least one aspect, $(d_1)=(d_2)=(d_3)$. In at least one aspect, $(d_1)$, $(d_2)$, and/or $(d_3)$ is between about 0.3 cm and about 10 cm, such as between about 0.5 cm and about 3 cm, for example about 1 cm.

Furthermore, varying the surface area of a surface of an electrode that contacts an underlying surface affects the electrochemical interaction of the electrode with the underlying surface. One way to take advantage of varying the surface area for a desired application is to vary the shape of one or more electrodes because, other parameters being equal, different shapes result in different surface areas of a contact surface of the electrode, as explained in more detail below. Electrodes of material systems of the present disclosure can have a variety of shapes. For example, an electrode of the present disclosure is square shaped. Alternatively, an electrode of the present disclosure has a shape selected from circular, star, rectangular, or polygonal, such as pentagonal, hexagonal, heptagonal, or octagonal. Furthermore, electrodes of the present disclosure may have one or more spokes extending (e.g., outwardly) from the shape.

An electrode of the present disclosure has a surface area (including spokes if present) that contacts an underlying layer (i.e., a contact surface area) that is suitable for a desired application. In at least one aspect, an electrode has a contact surface area from about 0.2 cm$^2$ to about 10 cm$^2$, such as from about 0.5 cm$^2$ to about 5 cm$^2$, such as from about 1 cm$^2$ to about 2 cm$^2$. The overall shape, spokes, and surface area can affect electrochemical monitoring methods for a particular testing application of the present disclosure.

Figure 7C:
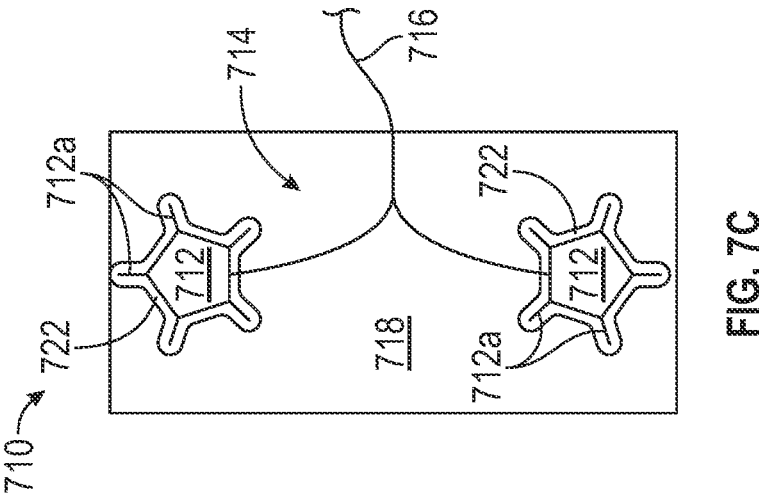
FIG. 7C is a plan view of a material system according to an aspect of the disclosure.
Figure 7B:
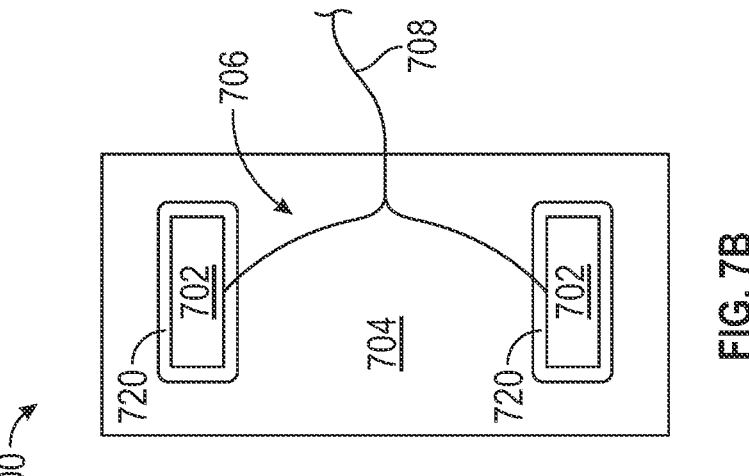
FIG. 7B is a plan view of a material system according to an aspect of the disclosure.
Figure 7A:
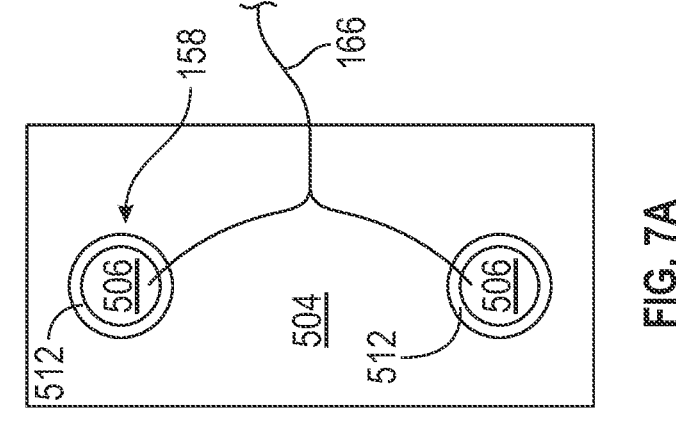
FIG. 7A is a plan view of a material system according to an aspect of the disclosure.

Each of FIGS. 7A, 7B, and 7C is a plan view of a material system according to an aspect of the present disclosure. As shown in FIG. 7A, material system 500 (of FIG. 5) comprises electrode pair 158 comprising electrodes 506 having a circular shape. Protective coating 512 can be disposed on electrodes 506. In at least one aspect, protective coating 512 is also disposed on electrical line 166 (not shown) to further protect electrical line 166 during flexing and/or salt fog exposure. As shown in FIG. 7B, material system 700 comprises electrode pair 706 comprising electrodes 702 having a rectangular shape. Each of electrodes 702 is disposed on material layer 704. Protective coating 720 (shown as transparent for clarity) is disposed on electrodes 702. In at least one aspect, protective coating 720 is also disposed on wire 708 (not shown) to further protect wire 708 during flexing and/or salt fog exposure. Each of electrodes 702 can be in electrical communication with a spectrometer via wire 708. As shown in FIG. 7C, material system 710 comprises electrode pair 714 comprising electrodes 712 having a pentagonal shape. Each of electrodes 712 has five spokes 712a extending outwardly from the pentagonal shape of electrodes 712. Each of electrodes 712 is disposed on material layer 718. Protective coating 722 (shown as transparent for clarity) is disposed on electrodes 712/712a. In at least one aspect, protective coating 722 is also disposed on electrical wire 716 (not shown) to further protect wire 708 during flexing and/or salt fog exposure. Electrodes 702 can be in electrical communication with a spectrometer via electrical wire 716.

Additionally or alternatively, the extent of corrosion of a material system of the present disclosure may be determined by a mass loss technique by weighing the material system after a cyclic flexing process and subtracting the weight from the weight of the material system before the cyclic flexing process. The mass loss technique is advantageous in aspects where electrodes are not disposed on material systems of the present disclosure.

Fabricating Material Systems

Fabricating a material system of the present disclosure can include lightly abrading an area of a coating layer that the electrode will be applied to. The abraded area can be cleaned with any suitable solvent and allowed to dry. Fabricating further includes disposing an electrode onto a coating layer, such as an abraded area of the coating layer. An end portion of insulation of an electrical wire, such as electrical line 166, can be removed to form an exposed portion of the electrical wire. The exposed portion is then contacted with an electrode, followed by application of non-conductive tape and/or a protective coating, such as protective coating 512.

Electrodes (and coating layers) of the present disclosure may be disposed on a metal substrate or layer by any suitable deposition process. Deposition processes include screen printing and 3D printing. In addition, photolithography may be applied to a coating layer followed by deposition of an electrode into the photolithographed region of the layer.

An electrode, for example, may be deposited using any suitable screen printing apparatus supplied, for example, by ASM Assembly Systems of Munich, Germany. Screen printing can be performed using a screen having one or more openings shaped with the desired geometry for electrode formation. A deposition material may be placed onto a portion of the screen and then squeegeed across the opening with a squeegee. More specifically, the screen is located over and just above the surface to be printed so that ink can be accurately deposited in the desired position. The mesh of the screen is brought into contact with the surface by the squeegee as it is moved across the screen. Ink is pushed into the open area forming the pattern and the surplus is removed by the edge of the squeegee. The mesh should peel away from the surface immediately behind the squeegee, leaving all the ink that was in the mesh deposited on the printing surface. The screen can then be lifted clear. The recommended screen tension is the tension necessary to stretch the mesh sufficiently to cause the screen to peel away from the substrate after printing but not be stretched so much that damage occurs. The applied tension depends on the screen material, e.g. the extension used for nylon meshes is typically 6% and for polyester 3%. It is normal practice for the squeegee to be held at a 45° angle relative to the frame area.

An electrode, for example, may be deposited using any suitable 3D printing apparatus supplied, for example, by nScrypt, Inc. of Orlando, FL. The nScript apparatus dispenses a conductive ink, e.g. DuPont CB230 silver-coated copper conductive ink or DuPont CB028 flexible silver ink, at a material flow rate that is adjusted by backpressure on the nozzle. The speed of the nozzle movement while patterning is constant, and the backpressure of the material in the nozzle is directly proportional to the flow rate. The nScript printing apparatus has a range of backpressures from 0 psi to about 30 psi. For the deposition of conductive ink onto coated panels, 18 psi backpressure can be used, which corresponds to a flow rate of about 0.052 grams/minute. After deposition of electrodes with the nScript apparatus, ink is baked for a fixed time at an elevated temperature to facilitate curing, e.g. about 150° C. to about 170° C. for about 10 minutes to about 30 minutes.

A coating layer, for example, may be photolithographed using any suitable photolithography apparatus. Electrodes formed by photolithography are typically interdigitated electrodes.

Suitable interdigitated electrodes can be obtained from, for example, Synkera Technologies, Inc. of Longmont, Colorado or Micrux Technologies, S.L. of Oviedo, Spain.

Testing Methods

A material testing process such as a cyclic flexing fog spray process, for example, within material testing apparatus 100, may be performed by exposing a material system, such as a panel, to a treating liquid, such as a salt fog, and flexing the material system. The exposing may be performed for from about 1 hour to about 4500 hours, such as about 200 hours to about 2000 hours, such as about 500 hours to about 1000 hours. In at least one aspect, the exposure zone, such as an enclosure 160, has a relative humidity of from about 0% to about 100%, such as from about 30% to about 95%, such as about ambient humidity. Exposing a material system to a treating liquid for about 1 hour and/or a relative humidity of about 30% or less mimics, for example, salt fog exposure experienced by the material system as part of an aircraft in an arid climate. Exposing a material system to a treating liquid for about 4500 hours and/or a relative humidity of about 80% or more mimics, for example, salt fog exposure experienced by the material system as part of an aircraft in a very humid climate or a moderately humid climate for a prolonged period of time. The liquid may contain water that is reagent grade water. The liquid may be a salt solution. The salt solution may comprise sodium chloride. The salt solution may contain about 2 parts sodium chloride in 98 parts water to about 6 parts sodium chloride in 94 parts water, such as about 5 parts sodium chloride in about 95 parts water. The liquid, such as a salt solution, may contain less than about 0.1% of bromide, fluoride and iodide. The liquid, such as a salt solution, may contain less than about 1 ppm, such as about 0.3 ppm, by mass of copper. The liquid, such as a salt solution, might not contain anti-caking agents, as such agents may act as corrosion inhibitors. Material systems which may be tested include, for example, aircraft panels which may form the skins or fuselage of an aircraft, a coated lap joint between two metal panels, a wing-to-fuselage assembly, and combinations thereof. The liquid may be atomized to form the treating liquid, such as a salt fog, that may have a pH ranging from about 3 to about 11, such as about 5 to about 8, such as about 6.5 to about 7.2. pH may be measured using a suitable glass pH-sensing electrode, reference electrode, and pH meter system. It may be desirable to adjust the pH of the treating liquid. For example, a treating liquid having a low pH may mimic a polluted atmosphere containing acid rain and the like. Furthermore, pH of the liquid that is atomized into the treating liquid may be adjusted to recalibrate the liquid during an exposing process. pH may be adjusted by, for example, addition of hydrochloric acid (HCl) to decrease the pH or addition of sodium hydroxide (NaOH) to increase the pH. The liquid, such as a salt fog, may be flowed at a rate of about 0.5 milliliters per hour (mL/h) to about 5 mL/h per 80

$cm^2$ of horizontal collection area, such as about 1 mL/h to about 2 mL/h per 80 $cm^2$ of horizontal collection area.

In at least one aspect, a material system, such as a panel, can be flexed by a fixture support using one of jaws 124a-f or by a plurality of jaws 124a-f. Flexing may be performed at varying frequencies to mimic the effect of mechanical stresses for corrosive conditions experienced by an aircraft material system under real world conditions. For example, a material system may be flexed at a frequency from about 0.1 Hertz (Hz) to about 150 Hz, about 0.1 Hz to about 100 Hz, about 0.1 Hz to about 60 Hz. A number of cycles during cyclic flexing may be from about 1 cycle to about 10,000 cycles, such as from about 500 cycles to about 5,000 cycles, such as from about 500 cycles to about 3,000 cycles.

Furthermore, the greater the curvature of a flexed material system, the greater the degradation to the material system using apparatus and methods of the present disclosure. For example, a flat panel having a length of 6 inches may be gripped by two jaws with a distance of 6 inches between the two jaws. The panel may be flexed at a rate of 0.33 Hz during exposure to a salt fog solution. In another example, a flat panel having a length of 7.5 inches may be gripped by two jaws also having a distance of 6 inches between the two jaws. The panel may be flexed at a rate of 0.33 Hz during exposure to a salt fog solution. The panel having a length of 7.5 inches has an increased curvature and undergoes increased degradation as compared to the panel having a length of 6 inches under otherwise identical conditions. Without being bound by theory, mechanical stresses that give curvature to a material system result in cracking of the material system which permits access of corrosive fluid, such as a salt fog, into a crack of the material system. After entering a crack of the material system, corrosive fluid may further enter between various additional layers (such as an underlying coating layer), if present. Accordingly, corrosive fluid may cause corrosion of the material system and/or one or more of the additional layers of the material system. Such conditions mimic the conditions experienced by an aircraft material system, such as a panel, during real world use.

In at least one aspect, an exposure zone, such as an enclosure 160 of material testing apparatus 100, can be maintained at a temperature ranging from about −196° C. to about 100° C., such as about −50° C. to about 95° C., such as about 0° C. to about 50° C., such as about 33° C. to about 37° C., for example about 35° C., during the exposing of a material system to a treating liquid (such as a salt solution atomized into a salt fog), and/or the flexing the material system. For example, the temperature can be maintained at a deep freeze temperature, such as from about −70° C. to about −20° C., such as about −55° C. Alternatively, the temperature can be maintained at a high temperature, such as from about 50° C. to about 80° C., such as about 60° C. The temperature may be monitored by a recording device or by a thermometer (not shown) that can be read from an outside surface of the apparatus, such as material testing apparatus 100. In at least one aspect, exposing a material system, such as a panel, to a liquid, such as a salt fog, and flexing the material system may be performed concurrently. In at least one aspect, exposing a material system, such as a panel, to a liquid, such as a salt fog, and flexing the material system may be performed sequentially. In at least one aspect, a material system may be exposed to a salt fog and flexed concurrently as well as sequentially, which provides recreation of an irregular or variable flight-specific strain profile that may be experienced by a material system in service. In at least one aspect, exposing a material system to a liquid and/or flexing the material system may be interrupted to visually inspect, rearrange, or remove the material system, and/or replenish a solution, such as a solution in liquid reservoir 104. For processes using a low humidity atmosphere in the exposure zone, a vacuum can be used to remove air from the exposure zone and/or dry air (e.g., relative humidity less than 30%) can be provided to the exposure zone without the introduction of a liquid, such as a salt fog. A gas, such as air, can be introduced to an apparatus at a pressure of from about 15 PSI to about 200 PSI, such as from about 15 PSI to about 60 PSI, such as about 60 PSI. During a low temperature cyclic flexing process, e.g., about −70° C. to about −20° C., or a high temperature cyclic flexing process, e.g., about 50° C. to about 80° C., the gas provided to the chamber and/or enclosure can have a temperature of from about −30° C. to about 50° C., such as about −10° C. to about 25° C., such as about 0° C. to about 20° C., for example about 10° C. or about 25° C. Without being bound by theory, a temperature in the apparatus that is independent of the temperature conditions of the motor may increase the longevity of the motor. Additionally or alternatively, the temperature of the motor can be controlled using any suitable temperature control device (e.g., a heater) coupled with the motor. For example, a surface of the motor may have a temperature of from about −30° C. to about 50° C., such as about −10° C. to about 25° C., such as about 0° C. to about 20° C., for example about 10° C. or about 25° C., as determined by a thermocouple coupled with the surface of the motor.

Before, during (in situ), and/or after flexing and spraying, the impedance of one or more layers of the material system can be measured using an electrochemical impedance spectrometer. Electrochemical impedance spectroscopy (EIS) provides in situ measurements of impedance of one or more layers of the material system. The measurements can provide information for determining coating properties, such as coating degradation, corrosion at the substrate/coating interface, and absorbed moisture over a period of time by analyzing the coating of the material system before and after exposure in the material testing apparatus 100. Electrochemical impedance spectroscopic processes of the present disclosure can be performed at an excitation potential of from about 5 mV to about 150 mV, such as about 10 mV to about 20 mV. Electrical frequencies for EIS may be from about 0.1 Hz-10,000 Hz, such as from about 1 Hz to about 5,000 Hz, such as from about 1 Hz to about 100 Hz, such as about 0.01 Hz to about 10 Hz, or from about 100 Hz to about 4,000 Hz. In at least one aspect, EIS is performed continuously at a set interval and fixed frequency from about 0.5 Hz to about 100 Hz, such as from about 1 Hz to about 10 Hz.

Further, the Disclosure Comprises the Following Examples

E1. A material testing apparatus comprising:
    an enclosure configured to control one or more of humidity, pressure, or temperature, the enclosure comprising;
    a jaw;
    a plate
    a first planar wall disposed on top of the plate; and
    a second planar wall parallel to the first planar wall separated by a vertical wall; and
    a motor or actuator disposed exterior to the enclosure, wherein the motor comprises a drive shaft coupled to a plurality of guide rods that are in contact with the vertical wall.

E2. The apparatus of example E1, wherein the enclosure is configured to control each of humidity, pressure, and temperature using a fog nozzle.

E3. The apparatus of any of examples E1 or E2, further comprising:
    a first guide rod coupled at a first end with the vertical wall and coupled at a second end with a block; and
    a second guide rod coupled at a first end with the vertical wall and coupled at a second end with the block.

E4. The apparatus of any of examples E1-E3, wherein the vertical wall comprises a plurality of jaws secured at a plurality of attachment locations on a face of the vertical wall.

E5. The apparatus of example t E4, wherein each attachment location of the plurality of attachment locations are configured to mount each jaw of the plurality of jaws.

E6. The apparatus of any of example s E1-E5, wherein the jaw comprises one or more securing screws disposed on a top portion and a bottom portion of the jaw.

E7. The apparatus of example E6, wherein the securing screws are symmetrically oriented along the jaw.

E8. The apparatus of example E6, wherein the first planar wall, second planar wall, and the vertical wall form an I-beam.

E9. The apparatus of any of examples E1-E8, further comprising a spectrometer and an electrode, wherein the electrode is coupled at a first end with the spectrometer and configured to be coupled at a second end with a material system.

E10. The apparatus of example E9, wherein the spectrometer is an electrochemical impedance spectrometer.

E11. A material testing apparatus comprising:
    an enclosure configured to control one or more of humidity, pressure, or temperature;
    a jaw comprising one or more securing screws oriented symmetrically along the jaw;
    a plate; and
    a motor or actuator disposed exterior to the enclosure, wherein the motor comprises a drive shaft coupled to a plurality of guide rods that are in contact with a vertical wall.

E12. The apparatus of example E11, wherein the enclosure is configured to control each of humidity, pressure, and temperature using a fog nozzle.

E13. The apparatus of any of examples E11 or E12, further comprising:
    a first guide rod coupled at a first end with the vertical wall and coupled at a second end with a block; and
    a second guide rod coupled at a first end with the vertical wall and coupled at a second end with the block.

E14. The apparatus of any of examples E11-E13, wherein the enclosure further comprises a first planar wall disposed on top of the plate.

E15. The apparatus of example E14, further comprising a second planar wall parallel to the first planar wall, wherein the second planar wall and first planar wall are separated by the vertical wall.

E16. The apparatus of example E15, wherein the vertical wall comprises a plurality of jaws secured at a plurality of attachment locations on a face of the vertical wall.

E17. The apparatus of example E16, wherein each attachment location of the plurality of attachment locations are configured to mount the jaw.

E18. The apparatus of any of examples E11-E17, further comprising a spectrometer and an electrode, wherein the electrode is coupled at a first end with the spectrometer and configured to be coupled at a second end with a material system.

E19. The apparatus of example E18, wherein the spectrometer is an electrochemical impedance spectrometer.

E20. A method for determining material performance comprising:

exposing a material system to a relative humidity of from 0% to 100% in a material testing apparatus and flexing the material system using a jaw in the apparatus at a first temperature in an enclosure of the apparatus, and a motor or actuator disposed exterior to the enclosure, wherein the motor comprises a drive shaft coupled to a plurality of guide rods that are in contact with a vertical wall connecting a first planar wall and a second planar wall located within the enclosure; and operating the motor or the actuator at a second temperature different from the first temperature during the flexing, the apparatus further comprising:

a jaw secured to the vertical wall comprising one or more securing screws oriented symmetrically along the jaw and configured to clamp the material system in the jaw.

E21. The method of example E20, wherein a first guide rod and a second guide rod are in direct contact with the vertical wall connecting the first planar wall and the second planar wall.

E22. The method of example E21, wherein a first guide rod is coupled at a first end with the vertical wall and coupled at a second end with a block, and a second guide rod is coupled at a first end with the vertical wall and coupled at a second end with the block.

E23. The method of any of examples E20-E22, wherein the jaw is configured to apply a uniform pressure to the material system.

E24. The method of any of examples E20-E23, wherein the securing screws are located on a top portion and a bottom portion of the material system.

Overall, apparatus and methods of the present disclosure provide material testing apparatus having a chamber configured to control one or more environmental parameters such as humidity, pressure, or temperature. Material testing apparatus further include a jaw configured to flex a material system. The jaw provides a uniform load distribution across the material by clamping a top portion and bottom portion of the material. The chamber includes a motor or actuator coupled to a drive shaft disposed exterior to the chamber at a first end and a first wall of the chamber at a second end. A plurality of rods coupled to the drive shaft can extend through the chamber into the chamber to provide uniform tension across the material.

Mechanical flexing of a material system in an apparatus of the present disclosure may provide uniform force such that a smoother and more even load distribution of the material occurs by applying a symmetrical force to the material system. The compounding effects of mechanical and chemical stresses combine to induce degradation that more accurately replicates corrosion and coating failures experienced by a material system, such as an aircraft panel, in a real-world environment. Accordingly, methods and apparatus of the present disclosure more accurately simulate the coating failures and corrosion observed with aircraft material systems during real-world use of the aircraft, such as under deep freeze and high temperature conditions.

While the foregoing is directed to aspects of the present disclosure, other and further aspects of the present disclosure may be devised without departing from the basic scope thereof. Furthermore, while the foregoing is directed to material systems, such as aircraft material systems, such as panels, coated lap joints between two or more panels, and wing-to-fuselage assemblies, aspects of the present disclosure may be directed to other material systems not associated with an aircraft, such as a multicomponent material system used in aerospace, automotive, marine, energy industry, and the like.

The invention claimed is:

1. A material testing apparatus comprising:
an enclosure configured to control one or more of humidity, pressure, or temperature, the enclosure comprising;
a jaw;
a plate;
a first planar wall disposed on top of the plate; and
a second planar wall parallel to the first planar wall separated by a vertical wall; and
a motor or actuator disposed exterior to the enclosure, wherein the motor comprises a drive shaft coupled to a plurality of guide rods that are in contact with the vertical wall.

2. The apparatus of claim 1, wherein the enclosure is configured to control each of humidity, pressure, and temperature using a fog nozzle.

3. The apparatus of claim 1, further comprising:
a first guide rod coupled at a first end with the vertical wall and coupled at a second end with a block; and
a second guide rod coupled at a first end with the vertical wall and coupled at a second end with the block.

4. The apparatus of claim 1, wherein the vertical wall comprises a plurality of jaws secured at a plurality of attachment locations on a face of the vertical wall.

5. The apparatus of claim 4, wherein each attachment location of the plurality of attachment locations are configured to mount each jaw of the plurality of jaws.

6. The apparatus of claim 1, wherein each the jaw comprises one or more securing screws disposed on a top portion and a bottom portion of the jaw.

7. The apparatus of claim 6, wherein the securing screws are symmetrically oriented along the jaw.

8. The apparatus of claim 6, wherein the first planar wall, second planar wall, and the vertical wall form an I-beam.

9. A method for determining material performance comprising:
exposing a material system to a relative humidity of from 0% to 100% in a material testing apparatus and flexing the material system using a jaw in the apparatus at a first temperature in an enclosure of the apparatus, and a motor or actuator disposed exterior to the enclosure, wherein the motor comprises a drive shaft coupled to a plurality of guide rods that are in contact with a vertical wall connecting a first planar wall and a second planar wall located within the enclosure; and
operating the motor or the actuator at a second temperature different from the first temperature during the flexing,
the apparatus further comprising:
a jaw secured to the vertical wall comprising one or more securing screws oriented symmetrically along the jaw and configured to clamp the material system in the jaw.

10. The method of claim 9, wherein a first guide rod and a second guide rod are in contact with the vertical wall connecting the first planar wall and the second planar wall.

11. The method of claim 10, wherein a first guide rod is coupled at a first end with the vertical wall and coupled at a second end with a block, and a second guide rod is coupled at a first end with the vertical wall and coupled at a second end with the block.

12. The method of claim 9, wherein the jaw is configured to apply a uniform pressure to the material system.

13. The method of claim 9, wherein the securing screws are located on a top portion and a bottom portion of the material system.

14. A material testing apparatus comprising:
an enclosure for controlling at least one of humidity, pressure, or temperature;
a plate within the enclosure;
a structural assembly on the plate comprising:
a first planar wall,
a second planar wall parallel to the first planar wall, and
a vertical wall extending between the first planar wall and the second planar wall;

at least one jaw mounted to the vertical wall;
a motor or actuator disposed exterior to the enclosure; and
a plurality of guide rods coupled to the motor or actuator and bearing against the vertical wall.

15. The material testing apparatus of claim 14, wherein the first planar wall, the second planar wall, and the vertical wall form a beam.

16. The material testing apparatus of claim 15, wherein the vertical wall forms a web of the beam and the first planar wall and the second planar wall form flanges of the beam.

17. The material testing apparatus of claim 14, wherein the plurality of guide rods contact opposing sides of the vertical wall.

18. The material testing apparatus of claim 17, wherein the guide rods extend through apertures in the vertical wall.

19. The material testing apparatus of claim 14, wherein the jaw is mounted to a face of the vertical wall between the first planar wall and the second planar wall.

20. The material testing apparatus of claim 19, wherein the jaw comprises securing screws disposed on a top portion and a bottom portion of the jaw.

\* \* \* \* \*